June 7, 1949.  C. R. WILSON  2,472,241
MILL CUTTER CENTER LOCATOR
Filed Oct. 8, 1946  4 Sheets-Sheet 3
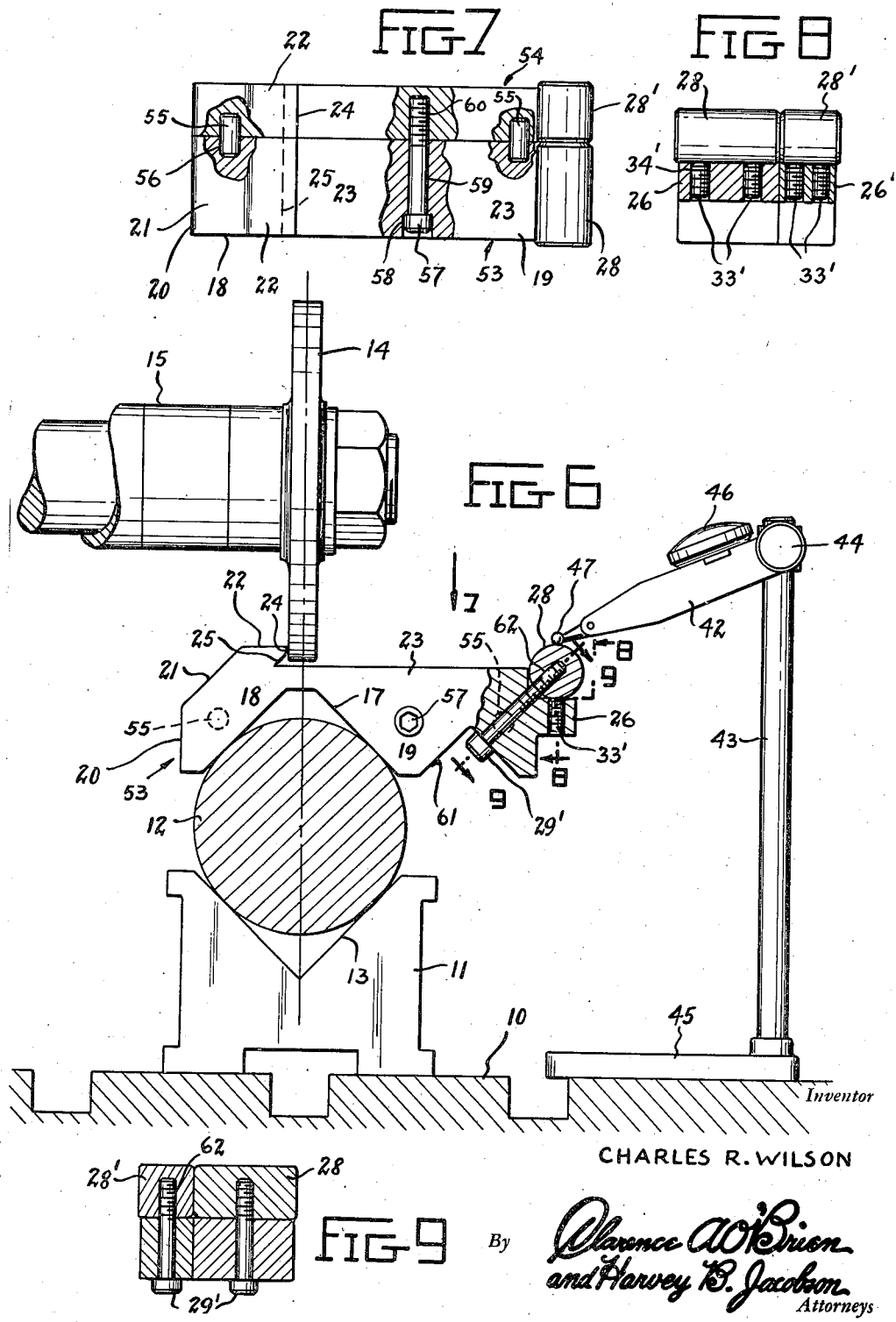
Inventor
CHARLES R. WILSON
By Clarence A. O'Brien
and Harvey B. Jacobson
Attorneys June 7, 1949. C. R. WILSON 2,472,241
MILL CUTTER CENTER LOCATOR
Filed Oct. 8, 1946 4 Sheets-Sheet 4
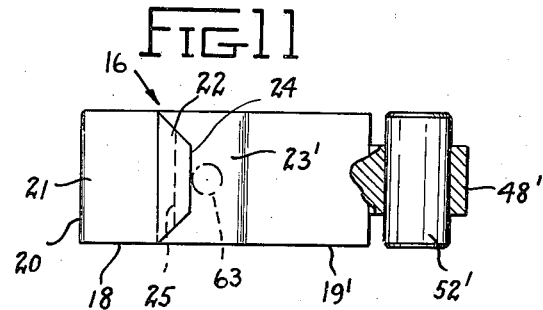
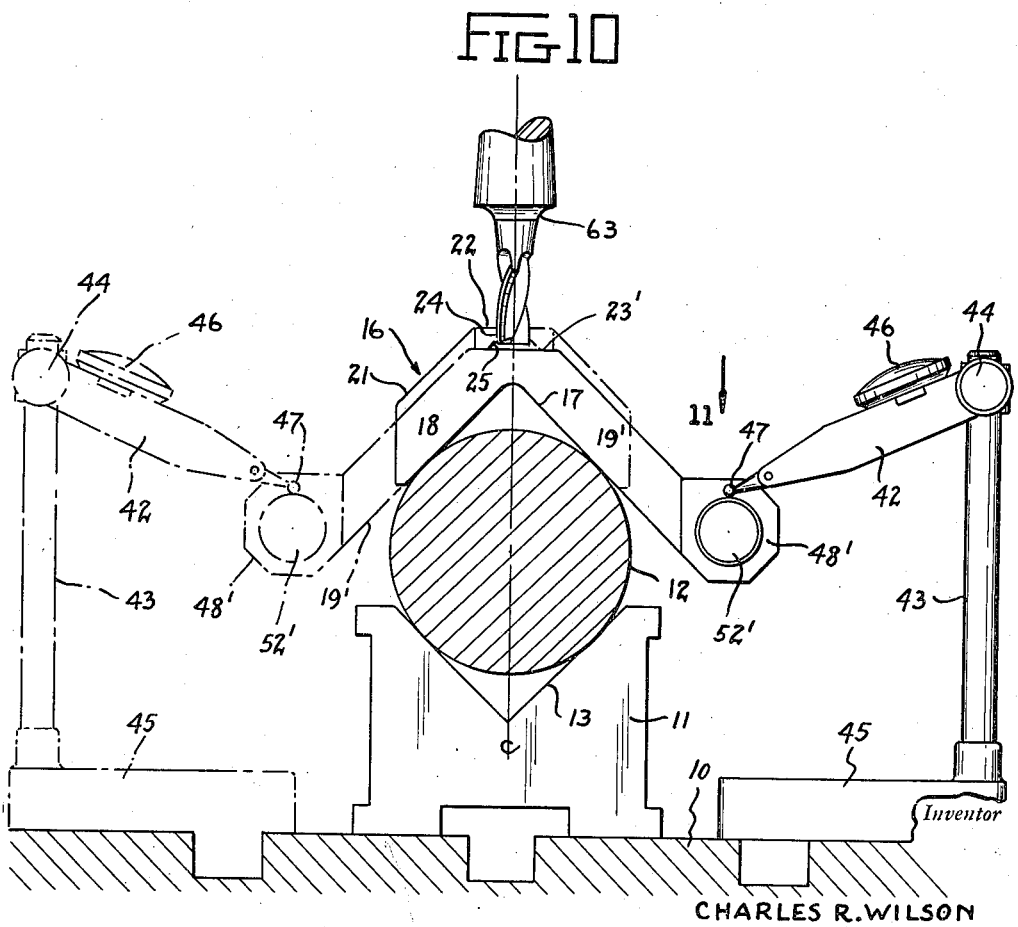
CHARLES R. WILSON
Inventor
By Clarence A. O'Brien
and Harvey B. Jacobson
Attorneys Patented June 7, 1949

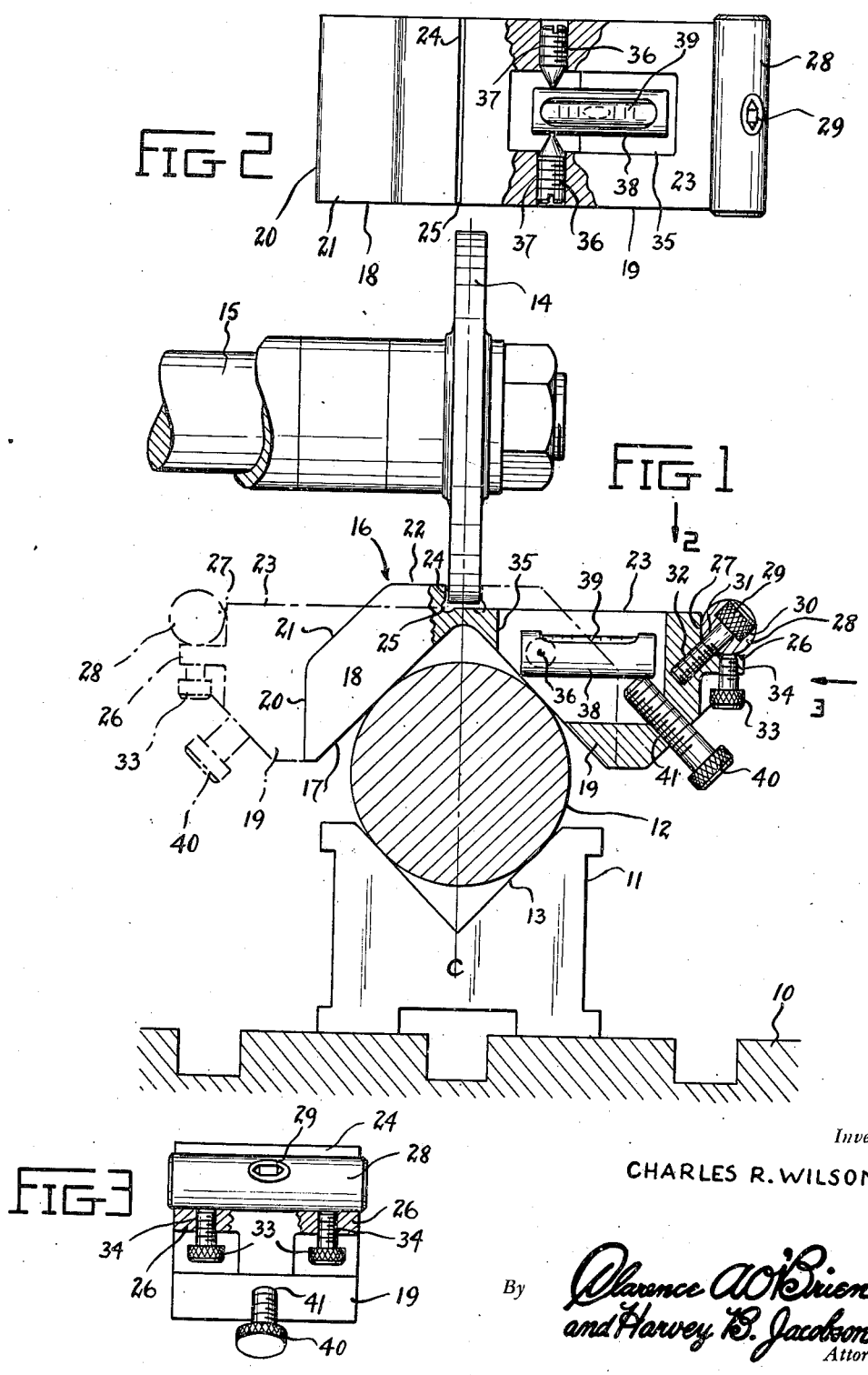

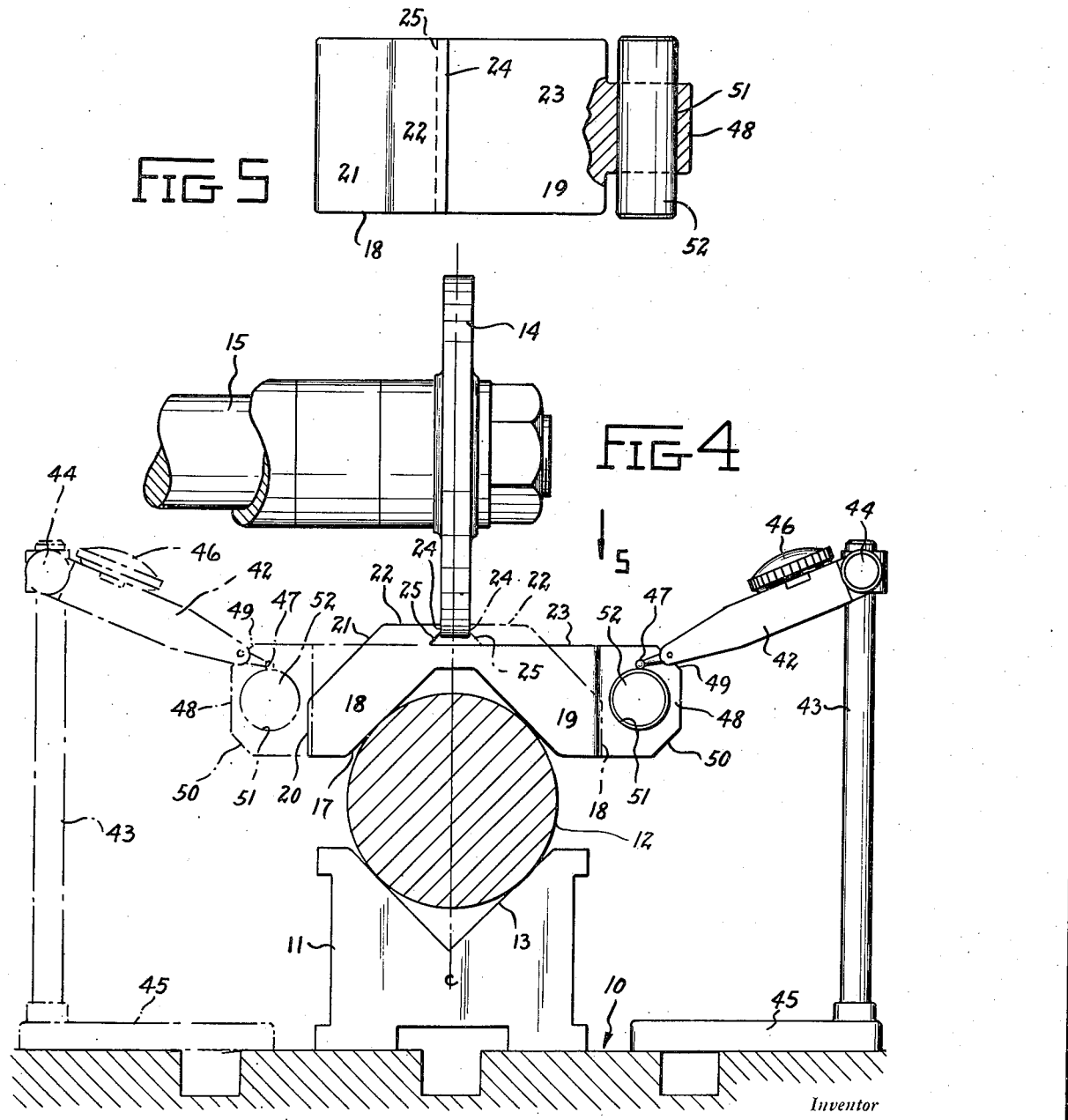

2,472,241

UNITED STATES PATENT OFFICE 2,472,241

MILL CUTTER CENTER LOCATOR

Charles R. Wilson, Pekin, Ill.

Application October 8, 1946, Serial No. 701,941

4 Claims. (Cl. 33—185)

This invention relates to a mill cutter center locator or method and device of locating a mill cutter in the center of a round shaft or any round work or stock using any mill cutter, end mill cutter or a woodruff key cutter on any milling machine which can perform such an operation.

The object of the invention is to provide a novel mill cutter center locator for use on a milling machine to set the cutter so that it will accurately cut a keyway slot or the like on the center of a round shaft or any round work, and which can be easily and quickly applied to the shaft or work for use in connection with an indicator such as a standard dial indicator so as to accurately locate the cutter in a central position for cutting a slot in line with the center or axis of the shaft or in connection with a spirit level forming a part thereof, and which is so constructed that the weight of the cutter center finder is off center and will keep the same or contact point thereof always located against the cutter blades securely.

Another object of the invention is to provide a mill cutter center locator by which the dial indicators when used, will accurately indicate whether or not the cutter is on dead center, so so that ready adjustment may be made by movement of the mill cutter or adjustment of the work on or with the work table, to balance the readings on both sides of the cutter so that the slot will be accurately cut thereby.

Another object of the device is to provide a mill cutter center locator which is relatively simple in construction and economical to manufacture, which will permit quick and efficient location of the cutter in a center position, either an end mill cutter or a vertical mill cutter, which will permit quick centering of the cutter.

Another object of the invention is to provide a mill cutter center locator which may be reversed on the work to get equal readings on a dial indicator on both sides of round work, so that when equal readings are recorded, the cutter is on dead center of the round work, thus saving time in locating the cutter, making mathematical calculations unnecessary and producing results for cutting which are extremely accurate.

Other objects and advantages reside in the details of construction and operation as more fully hereinafter described and claimed, reference being had to the accompanying drawings forming part hereof, wherein like numerals refer to like parts throughout, and in which:

Figure 1 is a sectional elevation of a mill cutter center locator in accordance with the invention, showing the same applied to a milling machine having an end mill cutter;

Figure 2 is a sectional plan view of the locator as shown in Figure 1 looking in the direction of the arrow 2;

Figure 3 is a sectional end elevation looking in the direction of the arrow 3 in Figure 1;

Figure 4 is a view similar to Figure 1 of a modified form of locator;

Figure 5 is a plan view of the locator shown in Figure 4 looking in the direction of the arrow 5;

Figure 6 is a view similar to Figures 1 and 4 of a further form of sectional or divided locator;

Figure 7 is a sectional plan view looking in the direction of the arrow 7 in Figure 6;

Figure 8 is a sectional view taken on the line 8—8 of Figure 6;

Figure 9 is a sectional view taken on the line 9—9 of Figure 6;

Figure 10 is a view similar to Figures 1, 4 and 6 of a modified form of locator in use in connection with a vertical type mill, and Figure 11 is a plan view of the locator shown in Figure 10, looking in the direction of the arrow 11.

Referring to the drawings in detail, in which like reference characters designate corresponding parts throughout the several views, and referring more specifically to Figures 1 to 3 inclusive, 10 designates a milling machine table on which is provided the usual standard or commercial V-block 11 to hold the work on the milling machine having the table 10 and by which the work may be adjusted. The numeral 12 indicates a round shaft or bar stock, or any other round work in which a slot is to be cut, and which is mounted in the V-groove of the block 11 as indicated at 13. A milling cutter 14 is shown mounted on its shaft or arbor 15 above the work, the cutting tool shown being a side mill cutter, although any other suitable cutter such as a woodruff key cutter, vertical cutter or otherwise may be used on any milling machine which can perform such an operation as cutting a slot, a keyway slot for example on center of a round shaft or any round work such as indicated at 12. It may also be mentioned that the cutter 14 is positioned with sufficient space or clearance between the cutting edge and the surface of the shaft or work to accommodate the locator of the present invention therebetween. The round shaft or any other round work in which a slot is to be cut on center, must be lined up horizontally and vertically to the travel of the mill table by indicator movement. The round work or shaft can be held to the table in a vise, or clamped directly to the table, or held between centers if the round work is centered at both ends, or located in any holding fixture made for that particular job as used on production mills.

As shown in Figures 1 to 3 inclusive, the mill cutter center locator is designated generally at 16 and the mill cutter, such as a side mill cutter indicated at 14 in Figure 1, is placed on the mill arbor and fastened securely. The cutter is placed approximately on center to the shaft or round stock by eyesight over the top of the shaft or work where the slot is to be cut, leaving enough space between the cutter and the shaft or work to allow room for the cutter center locator 16 which is cut accurately to size. The locator consists of a substantially rectangular body in plan in the form of a block having a 90 degree V-slot or groove 17 transversely of the bottom thereof and made of tool steel with oppositely inclined sides or side portions 18 and 19. The side 18 has a vertical end 20 with an inclined portion 21 thereabove joining with a horizontal top surface 22 projecting above the horizontal top surface or edge 23 of the side 19 and formed with an overhang or vertical tool engaging inner edge or side 24 which is undercut on an angle or by means of a bore 25 running transversely at the corner where the same meets the surface 23. This is for the purpose of permitting the end or edge 24 to contact the side of the cutter at the highest cutter blade on the mill cutter.

This is possible, by having the weight of the cutter center finder off center to keep the contact point 24 always located against the cutter blades securely when the locator is positioned upon the work as shown and described. This is done by having the side 19 longer and heavier than the side 18. This is also done by providing the outer end of the side 19 with a reduced transverse extension, lug or fin 26 forming a right angular recess or seat 27 for a cylindrical indicator pin 28 which is laid in the seat against the vertical and horizontal surfaces thereof and secured by a cap screw or socket head screw 29 with the head thereof counter-sunk in a counterbore or recess 30 in the pin and extending diagonally downwardly and inwardly in an inclined position through a reduced bore 31 in the pin 28 to thread into a socket 32 in the end wall or end of the side or arm 19. The socket head of the screw 29 is designed to receive a wrench for tightening and loosening the same, so that the same may be adjusted by means of thumb screws or set screws 33 threaded through bores 34 vertically through the extension 26 and engaging beneath the pin 28, so that the latter may be set truly horizontal and parallel to the contact point or end 24 and top surface 23.

In addition, the side 19 as distinguished from the side or arm 18, being the longer and heavier side or arm, is provided with an opening or recess 35 centrally and longitudinally thereof in the form of a cutout and through the opposite walls, pin point bearings or screws 36 are mounted in threaded or unthreaded bores 37 accurately in alignment with each other so that the pin points will hingedly or pivotally support the metallic case 38 of a spirit level 39, the opposite or free end, that is the outer end of which is engaged by an adjusting screw 40 threaded through a bore 41 in the beveled lower outer wall or corner of the recess 35 so that the level can be adjusted so that the bubble thereof indicates a level position.

This device in connection with the pin 28, may be used in reverse positions as indicated in solid and dotted lines in Figure 1 of the drawings, in the same manner as shown in Figures 4, 6 and 10 in which the mill cutter, such as a side mill cutter for example as shown in Figure 1, is placed on the mill arbor and fastened securely. The cutter is placed approximately on center to the shaft by eyesight over the top of the shaft or work where the slot is to be cut. Enough space is left between the cutter and the shaft or work to allow room for the cutter center locator 16 when positioned upon the shaft or work as shown in Figure 1. The locator is placed on the round work with the 90 degree V to the work as indicated at 17 and the cutter contact point or end 24 located to the cutter blades of the side mill cutter. The weight of the cutter center finder being off center will keep the contact point always located against the cutter blades securely and with an indicator, such as a dial indicator shown at 42, pivotally mounted on a standard or supporting rod 43 as indicated at 44, having a base 45 on the milling table 10, the indicator having the dial 46 and the finger 47, is positioned to locate the finger over the ground pin 28 of the locator 16 and the highest reading is noted as the finger is moved back and forth over the pin, the contact point 24 being engaged against the highest cutter blade on the mill cutter for greater accuracy. This is done by rotating the mill cutter and arbor and noting the indicator for its highest reading. The indicator dial is then set at zero at its highest reading, the locator is then reversed in position on the shaft or work 12 in the manner indicated in dotted lines so that the indicator reading can be found locating from the cutter blade on the opposite side of the cutter in the same manner as explained for locating the beginning side of the cutter. After the highest indicator reading is found for the second side of the mill cutter, this reading on the indicator is noted. If the reading is the same as on the first side of the cutter, then the cutter is on dead center. However, if there is a difference in the reading, for example, .010 inch, then the mill cutter must be moved half the difference in the two indicator readings, or .005 inch toward the zero of the first indicator reading, rechecking both sides of the cutter to note if the same reading is recorded on the indicator by reversing the position of the locator. After the same reading is recorded on the indicator at both sides, then the slot can be cut on the true dead center.

While the device is designed to be used for extreme accuracy in the manner described, sacrificing a small degree of accuracy, the spirit level 39 may be used instead of the indicator pin and indicator. This level can be adjusted by the screw 40 for aligning the tool with the round shaft or work so that by the graduations on the level, when the readings on both sides are the same, so that the bubble is absolutely centrally positioned, the slot will be cut in the center of the shaft or work. The device is made with both the indicator pin and the level built in as one unit and either or both used as described. The vial of the level is of course sealed in the adjustable metal tube capable of pivoting or swinging movement as described, and graduated to indicate the central position for accuracy.

In Figures 4 and 5 of the drawings, the device is used in the same manner as previously described, but is of single or unitary construction and slightly modified form in that the side or arm 19 is not recessed to receive the level, but is longer and heavier than the side or arm 18. It is formed with a central outwardly extending vertical lug or extension 48 the full height or thickness of the side or arm 19 and may be beveled at the corners, as indicated at 49 and 50 at the top and bottom. It is also drilled to provide a bore 51, such as a 15/16 drill to provide a .4495 ream press fit hole for a .500 ground press fit pin 52 corresponding to the indicator pin 28. This pin is parallel with the contact point or end 24 as well as the top surface 23 and with the 90 degree V-cut or recess 17 in the bottom accurately machined of tool steel as described. The device may be made in different sizes and width, to the latter of which the length of the pin will accord or correspond and the pin may be engaged by the indicator on either side of the lug or extension at the back or front. The measurements of the locator could of course vary, such as one and an eighth inch high at the contact side to 15/16 of an inch at the opposite side and three and a half inches long to one inch wide or thick or otherwise to suit any particular or peculiar job.

In the form shown in Figures 6 to 9 of the drawings inclusive, the construction is practically the same, except that in this form, the device is made sectional or divided with adjustable contact pins and used in the same manner as previously described and also as will be hereinafter related. It comprises the two sections 53 and 54, the latter about half the width or thickness of the former and held together and in alignment accurately by dowel pins 55 adjacent each end, entering sockets 56 in the meeting or co-acting faces of the sections for alignment. They are held together by a cap screw 57 the head of which is seated in a counter-bore 58, and then passed through a bore 59 and threaded into a counter-bore socket 60 in the section 54. The cap screw 57 may be a socket head screw as shown. Extensions 26 and 26' are provided on the sections 53 and 54 and brought into alignment when the sections or blocks are connected to receive separate contact pins 28 and 28', the latter shorter than the former, but of the same diameter and having their ends beveled as shown. Thus the pins are brought into meeting engagement at their ends or may be separated and are held in position each with a pair of set screws 33' engaged in threaded bores 34' in the extensions 26 and 26'. The anchoring and adjusting screws 29', may be extended from a V-cut 61 at the bottom of the arm or end 19 diagonally or in an inclined position upwardly and outwardly, where the threaded end thereof is engaged in threaded sockets 62 in the pins 28 and 28', two being provided as clearly shown in Figure 9 of the drawings, so that the pins may be brought into two horizontal positions and accurately aligned parallel with the surfaces 23 and end or contact point 24. In this way, a high point on the pin is avoided and accuracy insured in placing the tool on dead center as indicated by the center lines in Figures 1, 4, 6 and 10 of the drawings. By this means, the groove or slot in the shaft or work is cut absolutely on dead center, and the pins are adjustable in the same general manner as the pin 28 in Figure 1 of the drawings. This complete device is used to best advantage upon work of large diameter and considerable length, but when the surface of the work is relatively short or narrow and of small diameter, the section 54 may be detached from the section 53 and employed independently of the latter.

In the form shown in Figures 10 and 11 of the drawings, for a woodruff key cutter, the parts are the same and similarly numbered except that a vertical type mill 63 is shown with the locator in position between the same and the round shaft or work 12 suitably held in the machine. In this instance, the side or arm 19' is longer and extends downwardly without the long horizontal flat top surface 23, the top surface being relatively short as indicated at 23' and extending down at the bottom V-groove or recess 17 into the central lug or extension 48' which is formed similar to the lug 48 to receive a corresponding pin 52' used in the same manner as described in connection with Figures 4 and 5 of the drawings with the contact point or end 24 engaging the highest point or blade of the vertical type mill or cutter 63.

In either instance, the weight of the cutter finder or locator being off center, will keep the contact point always located against the cutter blades securely. With an indicator fastened to an indicator stand such as described, the indicator finger is located over the ground pin of the cutter center locator and the highest reading noted as the finger moves back and forth over the pin. It is important to find the highest cutter blade on the milling cutter for greater accuracy to engage the contact point or end 24, this being done by rotating the milling cutter and arbor and noting the indicator for its highest reading. By setting the indicator dial at zero at its highest reading, and reversing the mill center locator on the shaft or work, so that the indicator reading can be found locating from the cutter blades on the opposite side of the cutter, this is done in the same manner explained for locating the beginning side of the cutter. After the highest indicator reading is found for the second side of the mill cutter, this reading is noted on the indicator and if the reading is the same as on the first side of the cutter, then the cutter is on dead center. If there is a difference in the readings, the difference is divided and the mill cutter or work moved half the difference in the two indicator readings toward the zero of the first indicator reading. The readings are checked on both sides of the cutter to note if the same reading is recorded on the indicator and after the reading is recorded on the indicator, then the slot can be cut on true dead center. The device can be made in various sizes and shapes to suit any particular or peculiar job and the 90 degree V-cut made larger or smaller than 90 degrees and the undercut at the contact point or end 24 at 60 degrees or otherwise, as the angle may vary, or the same may be bored as shown in Figure 1. The pins for engagement with the contact pin of the dial indicator can be mounted in various ways and can also be made adjustable for alignment as described or otherwise. The locator can be made completely adjustable, to make it universal.

While in the foregoing there has been shown and described the preferred embodiment of this invention it is to be understood that minor changes in the details of construction, combination and arrangement of parts may be resorted to without departing from the spirit and scope of the invention as claimed.

I claim:

1. A mill cutter center locator comprising a substantially rectangular body in plan having oppositely inclined arms forming a V-cut at the bottom to engage a round shaft or stock of work, said body having a raised portion at one side of the top forming a vertical and transverse contact surface parallel to a plane bisecting the angle included between the arms of the V-cut and adapted to engage the side of a cutter, the other side of the body being off center as to the weight of the body to maintain said surface in contact with the blade in reverse positions, an extension on the end of said other side and a horizontal contact pin held in said extension parallel to said contact surface in a true horizontal position.

2. A mill cutter center locator comprising a block having a work engaging V-cut at the bottom and provided with a high portion on the top having a side contact surface transverse of the block and located to one side of and parallel with a vertical plane bisecting the angle included between the work engaging surfaces of the V-cut and adapted to contact a cutter, the block having a transverse horizontal contact pin mounted thereon to the other side of said plane and parallel to the contact surface and adapted to be engaged by the pointer-actuating finger of a dial indicator supported on the table of a milling machine.

3. The construction defined in claim 2, wherein the portion of the locator at said other side of said plane is heavier than the portion thereof at the first-named side of said plane to keep the contact surface always located against the cutter when the locator is positioned on the work.

4. The construction defined in claim 2, in combination with means to independently vertically adjust the ends of said contact pin.

CHARLES R. WILSON.

REFERENCES CITED

The following references are of record in the file of this patent:

UNITED STATES PATENTS

| Number | Name | Date |
| --- | --- | --- |
| 868,074 | Clark | Oct. 15, 1907 |
| 1,020,020 | Brawley | Mar. 12, 1912 |
| 1,486,667 | Jerman | Mar. 11, 1924 |
| 1,749,980 | Loeser | Mar. 11, 1930 |
| 1,794,162 | Flamm | Feb. 24, 1931 |
| 2,097,849 | Torbert, Jr. | Nov. 2, 1937 |
| 2,398,066 | Whale | Apr. 9, 1946 |

FOREIGN PATENTS

| Number | Country | Date |
| --- | --- | --- |
| 35,523 | Austria | Dec. 10, 1908 |